(12) United States Patent
Takeguchi et al.

(10) Patent No.: US 8,909,067 B2
(45) Date of Patent: Dec. 9, 2014

(54) OPTICAL OUTPUT MODULE, OPTICAL TRANSCEIVER, AND OPTICAL TRANSMISSION SYSTEM

(75) Inventors: Kouji Takeguchi, Kanagawa (JP);
Shigehiro Takashima, Saitama (JP);
Taichi Kogure, Kanagawa (JP);
Hirofumi Nakagawa, Kouza-gun (JP);
Saki Narisawa, Yokohama (JP)

(73) Assignee: Oclaro Japan, Inc., Kanagawa (JP)

( * ) Notice: Subject to any disclaimer, the term of this patent is extended or adjusted under 35 U.S.C. 154(b) by 168 days.

(21) Appl. No.: 13/470,497

(22) Filed: May 14, 2012

(65) Prior Publication Data
US 2012/0301153 A1  Nov. 29, 2012

(30) Foreign Application Priority Data

May 23, 2011  (JP) ................................. 2011-115159
Apr. 16, 2012  (JP) ................................. 2012-092702

(51) Int. Cl.
*H04B 10/00* (2013.01)
*G02F 1/01* (2006.01)
*H04B 10/50* (2013.01)
*G02F 1/225* (2006.01)

(52) U.S. Cl.
CPC .......... *H04B 10/5053* (2013.01); *G02F 1/0123* (2013.01); *H04B 10/50577* (2013.01); *G02F 1/225* (2013.01); *H04B 10/50575* (2013.01)
USPC ............ 398/188; 398/182; 398/198; 398/200

(58) Field of Classification Search
USPC ................................................. 398/182–201
See application file for complete search history.

(56) References Cited

U.S. PATENT DOCUMENTS

| | | | | |
|---|---|---|---|---|
| 5,805,321 A * | 9/1998 | Ooi et al. | ......................... | 398/98 |
| 5,926,297 A * | 7/1999 | Ishikawa et al. | ................ | 398/43 |
| 7,116,460 B2 * | 10/2006 | Griffin | .......................... | 359/245 |
| 7,266,306 B1 * | 9/2007 | Harley et al. | .................. | 398/182 |
| 7,366,362 B2 * | 4/2008 | Tanimura | .......................... | 385/1 |
| 7,817,923 B2 * | 10/2010 | Akiyama et al. | ............... | 398/188 |
| 8,184,988 B2 * | 5/2012 | Chen et al. | ..................... | 398/187 |
| 8,457,503 B2 * | 6/2013 | Akiyama | ...................... | 398/188 |
| 8,472,810 B2 * | 6/2013 | Akiyama et al. | .............. | 398/184 |
| 8,565,615 B2 * | 10/2013 | Nishihara et al. | ............. | 398/183 |

(Continued)

FOREIGN PATENT DOCUMENTS

JP  2007-082094 A  3/2007
JP  2010-204689 A  9/2010

*Primary Examiner* — Agustin Bello
(74) *Attorney, Agent, or Firm* — Mattingly & Malur, PC

(57) ABSTRACT

The I phase modulator modulates a phase based on the bias voltage in which a first modulation signal and a first pilot signal are inherent and the Q phase modulator modulates a phase based on the bias voltage in which a second pilot signal different from the first pilot signal and a second modulation signal are inherent. A time-average power synchronous detection unit detects an optical power at a timing at which the positivity and negativity of the voltages of both pilot signals become the same, and an optical power when the positivity and negativity of the voltages of both pilot signals are opposite. The bias voltage control unit controls the bias voltage so that the difference between both the optical powers becomes small based on the detection result of the time-average power synchronous detection unit.

10 Claims, 11 Drawing Sheets

(56) References Cited

U.S. PATENT DOCUMENTS

| | | | |
|---|---|---|---|
| 8,582,981 B2 * | 11/2013 | Akiyama et al. | 398/188 |
| 2005/0074245 A1 * | 4/2005 | Griffin | 398/188 |
| 2005/0117191 A1 * | 6/2005 | Griffin | 359/245 |
| 2006/0263098 A1 * | 11/2006 | Akiyama et al. | 398/188 |
| 2007/0065161 A1 * | 3/2007 | Miura et al. | 398/186 |
| 2011/0170877 A1 * | 7/2011 | Akiyama | 398/185 |
| 2012/0082465 A1 * | 4/2012 | Akiyama et al. | 398/158 |
| 2012/0301153 A1 * | 11/2012 | Takeguchi et al. | 398/135 |

* cited by examiner

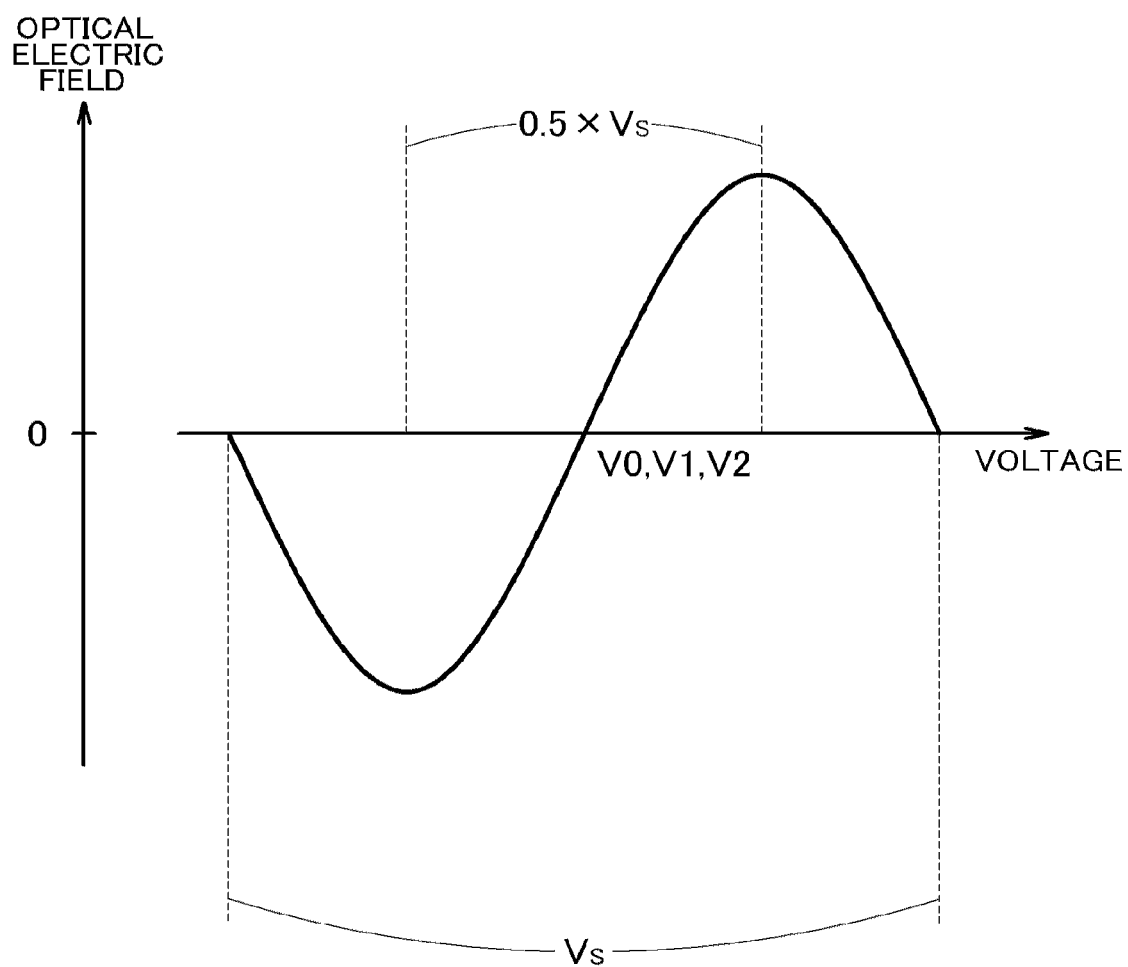

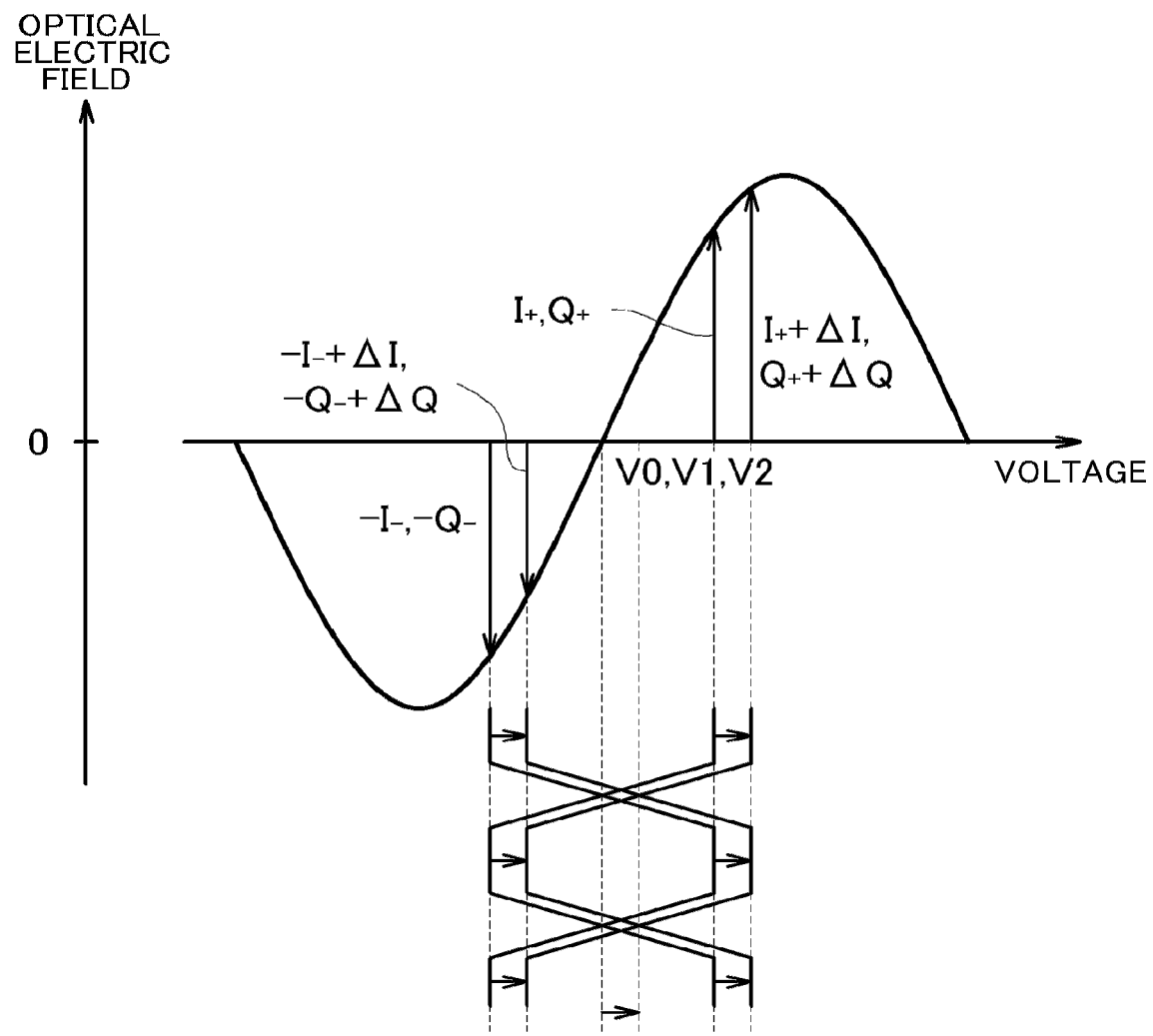

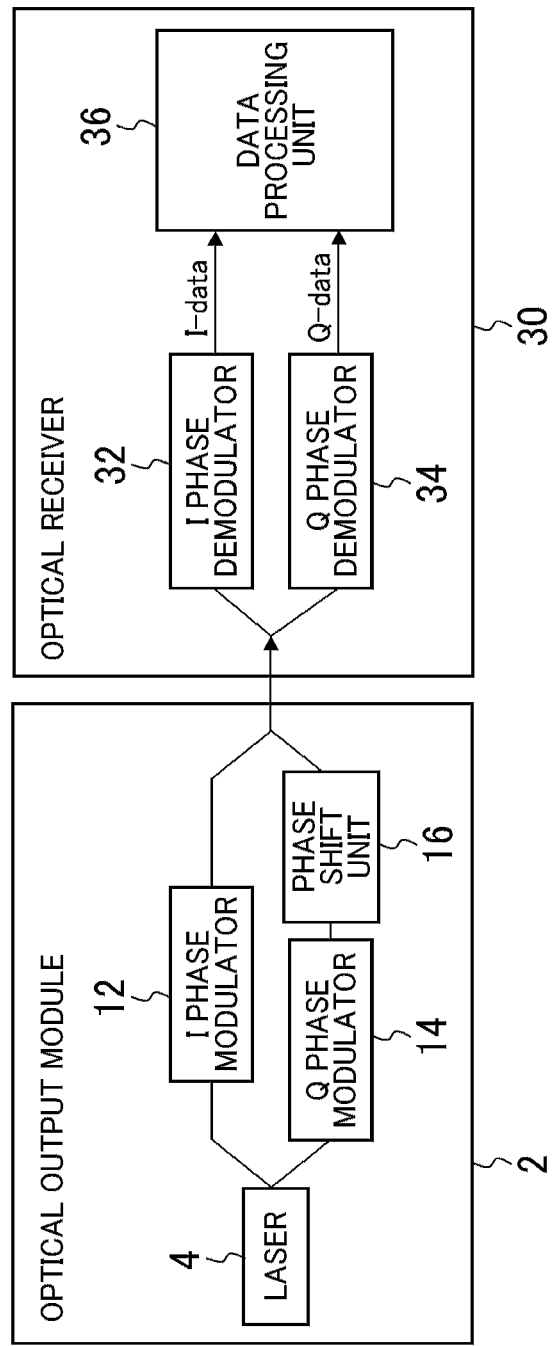

US 8,909,067 B2

OPTICAL OUTPUT MODULE, OPTICAL TRANSCEIVER, AND OPTICAL TRANSMISSION SYSTEM

CROSS-REFERENCE TO RELATED APPLICATION

The present application claims priority from Japanese application JP2011-115159 filed on May 23, 2011 and Japanese application JP2012-092702 filed on Apr. 16, 2012, the content of which is hereby incorporated by reference into this application.

BACKGROUND OF THE INVENTION

1. Field of the Invention

The present invention relates to an optical output module, an optical transceiver, and an optical transmission system.

2. Description of the Related Art

In recent years, in WDM (Wavelength Division Multiplexing) optical communication systems, the DQPSK modulation scheme has shown excellent characteristics such as high receiving sensitivity and long-distance transmission and there has been growing interest in increasing the performance of the optical communication systems.

FIG. 6 illustrates the basic configuration of the DQPSK optical transmitter 100. The DQPSK optical transmitter 100 includes a signal generating unit 102, a first amplifier 104, a second amplifier 106, a laser light source 108, an I phase modulator 110, a Q phase modulator 112, and a phase shift unit 114.

The first amplifier 104 generates an amplified signal of a first driving signal output by the signal generating unit 102 as a first modulation signal and the second amplifier 106 generates an amplified signal of a second driving signal output by the signal generating unit 102 as a second modulation signal. An optical signal output from the laser light source 108 is input to the I phase modulator 110, and the I phase modulator 110 modulates the phase of the optical signal based on the first modulation signal. In addition, the optical signal output from the laser light source 108 is also input to the Q phase modulator 112, and the Q phase modulator 112 modulates the phase of the optical signal based on the second modulation signal, in addition to which, the phase shift unit 114 performs phase shifting based on a bias voltage in order to set the phase difference of the two optical signals to 90°.

Next, the optical signal upon which phase modulation is performed by the I phase modulator 110 and the optical signal, upon which phase modulation is performed by the Q phase modulator 112 and phase shifting is performed by the phase shift unit 114, are combined and output as a DQPSK optical signal.

In such a DQPSK optical transmitter 100, since the optimum value of the bias voltage for the phase shift unit 114 to shift the phase of 90° drifts with respect to the ambient temperature and elapsed time, it is necessary to adjust the bias voltage to the optimum value.

Thus, in JP 2007-82094 A and JP 2010-204689 A, as shown in FIG. 7, a low-frequency pilot signal is given to the bias voltage. In addition, the photodiode 116 is set to receive the DQPSK optical signal. Further, a power synchronous detection unit 118 performs synchronous detection according to the frequency of the pilot signal so as to detect the power of the low-frequency component of the DQPSK optical signal. Thus, based on the power detected by the power synchronous detection unit 118, a bias control unit 120 adjusts the bias voltage so that the power of the low-frequency component of the DQPSK optical signal is minimized.

However, when adjusting the bias voltage as described above, it is necessary to add an RF (Radio Frequency) power detector to the power synchronous detection unit 118, or the like, and there are problems in that the scale of the hardware and the manufacturing cost are increased as a result.

SUMMARY OF THE INVENTION

An object of the present invention is to enable the adjustment of the phase shift amount to an intended phase shift amount in a case where phase of the optical signal is shifted based on the bias voltage even when a pilot signal is not given to the bias voltage.

In order to achieve the above object, the optical output module according to the present invention includes: a laser; first phase modulating means for modulating a phase of an optical signal output from the laser based on a first bias voltage in which a first modulation signal is inherent; second phase modulating means for modulating a phase of the optical signal output from the laser based on a second bias voltage in which a second modulation signal is inherent; phase shift means for shifting a phase of the optical signal output from the laser based on a third bias voltage; and bias control means for controlling the third bias voltage, in which an optical signal of which a phase is, modulated by the first phase modulating means and an optical signal of which a phase is modulated by the second phase modulating means and of which a phase is shifted by the phase shift means are combined to be a modulated optical signal, and the modulated optical signal is output, the first phase modulating means modulates a phase of the optical signal output from the laser based on the first bias voltage in which the first modulation signal and a first low-frequency signal are inherent, the second phase modulating means modulates a phase of the optical signal output from the laser based on the second bias voltage in which a second low-frequency signal which is a low-frequency signal different from the first low-frequency signal and the second modulation signal are inherent, the optical output module further includes detection means for detecting a first power which is the power of the modulated optical signal at a timing where both of a voltage of the first low-frequency signal and a voltage of the second low-frequency signal are one of positive and negative and a second power which is the power of the modulated optical signal at a timing where one of the voltages of the first low-frequency signal and the second low-frequency signal is positive and the other voltage is negative, and the bias control means controls the third bias voltage so that a difference between the first power and the second power becomes small based on the detection result of the detection means.

In one embodiment of the present invention, when the phase of the optical signal is modulated by the first phase modulating means, an optical electric field of the optical signal of which the phase is modulated may be periodically changed at a first voltage period according to the voltage used in the phase modulation of the optical signal by the first phase modulating means, and, when the phase of the optical signal is modulated by the second phase modulating means, an optical electric field of the optical signal of which the phase is modulated may be periodically changed at a second voltage period according to the voltage used in the phase modulation of the optical signal by the second phase modulating means, whereby an amplitude of the first modulation signal is less than half of the first voltage period and the amplitude of the second modulation signal may be less than half of the second voltage period.

In addition, in another embodiment of the present invention, the optical output module may further include: first amplifying means for generating an amplified signal of a driving signal as the first modulation signal; second amplifying means for generating an amplified signal of a driving signal as the second modulation signal; amplification factor changing means which, after continuing to change an amplification factor of one of the first amplifying means and the second amplifying means for a certain time, continues to change an amplification factor of the other for a certain time; first power detection means for detecting the power of the modulated optical signal when the amplification factor changing means continues to change the amplification factor of the first amplifying means; second power detection means for detecting the power of the modulated optical signal when the amplification factor changing means continues to change the amplification factor of the second amplifying means; first amplification factor setting means for setting the amplification factor of the first amplifying means based on the characteristic amounts relating to the change of the detection result according to the first power detection means after the amplification factor changing means continues to change the amplification factor of the first amplifying means for a certain time; and second amplification factor setting means for setting the amplification factor of the second amplifying means based on the characteristic amounts relating to the change of the detection result according to the second power detection means after the amplification factor changing means continues to change the amplification factor of the second amplifying means for a certain time.

In addition, in still another embodiment of the present invention, before both of the amplification factor of the first amplifying means and the amplification factor of the second amplifying means are set, the first phase modulating means may modulate a phase based on the first bias voltage in which the first modulation signal is inherent instead of modulating a phase based on the first bias voltage in which the first modulation signal and the first low-frequency signal are inherent, and, before both of the amplification factor of the first amplifying means and the amplification factor of the second amplifying means are set, and the second phase modulating means may modulate a phase based on the second bias voltage in which the second modulation signal is inherent instead of modulating a phase based on the second bias voltage to which the second low-frequency signal and the second modulation signal are inherent.

In order to achieve the above object, the optical transceiver according to the present invention includes an optical output module outputting an optical signal and an optical receiver module receiving an optical signal, wherein the optical output module includes: a laser; first phase modulating means for modulating a phase of an optical signal output from the laser based on a first bias voltage in which a first modulation signal and a first low-frequency signal are inherent; second phase modulating means for modulating a phase of the optical signal output from the laser based on a second bias voltage in which a second low-frequency signal which is a low-frequency signal different from the first low-frequency signal and a second modulation signal are inherent; phase shift means for shifting the phase of the optical signal output from the laser based on a third bias voltage; detection means for detecting a first power which is a power of a modulated optical signal in a period where both of a voltage of the first low-frequency signal and a voltage of the second low-frequency signal are one of positive and negative and for detecting a second power which is a power of the modulated optical signal in a period at a timing where one of the voltages of the first low-frequency signal and the second low-frequency signal is positive and the other voltage is negative, the modulated optical signal formed by combining an optical signal of which a phase is modulated by the first phase modulating means and an optical signal of which a phase is modulated by the second phase modulating means and of which a phase is shifted by the phase shift means; and bias control means for controlling the third bias voltage so that a difference between the first power and the second power becomes small based on the detection result of the detection means, and the optical output module outputs the modulated optical signal.

In still another embodiment of the invention, the bias control means may control the third bias voltage so that the phase difference of the optical signal of which a phase is shifted by the phase shift means based on whichever of the first power and the second power is larger and an optical signal of which a phase is modulated by the first modulating means to enter a predetermined state from a state of 90×(4k+1)° and a state of 90×(4k+3)° where k is an integer.

In order to achieve the above-described object, the optical communication system according to the present invention includes the above-described optical transceiver, an optical fiber transmitting the modulated optical signal output from the optical transceiver, and an optical receiver receiving the modulated optical signal transmitted by the optical fiber, in which the optical receiver performs demodulation processing according to the predetermined state from the state of 90×(4k+1)° and the state of 90×(4k+3)°.

In yet another embodiment of the present invention, the optical receiver includes a first phase demodulator, a second phase demodulator demodulating a signal of a phase different from the first phase demodulator, and a data processing unit outputting output data based on first data output by the first phase demodulator and second data output by the second phase demodulator, in which the data processing unit processing in a predetermined mode of a first mode outputting output data based on the first data and the second data and a second mode outputting output data based on data replacing the first data and the second data, wherein the predetermined mode is corresponding to the predetermined state.

BRIEF DESCRIPTION OF THE DRAWINGS

FIG. 3A is a diagram showing the relationship between the optical electric field and voltage.

FIG. 3C is a diagram showing the relationship between the optical electric field and voltage.

FIG. 8 is a diagram illustrating the optical transmission system according to an embodiment of the present invention.

DETAILED DESCRIPTION OF THE INVENTION

Hereafter, description will be given of favorable embodiments for realizing the present invention with reference to the drawings.

Figure 1:
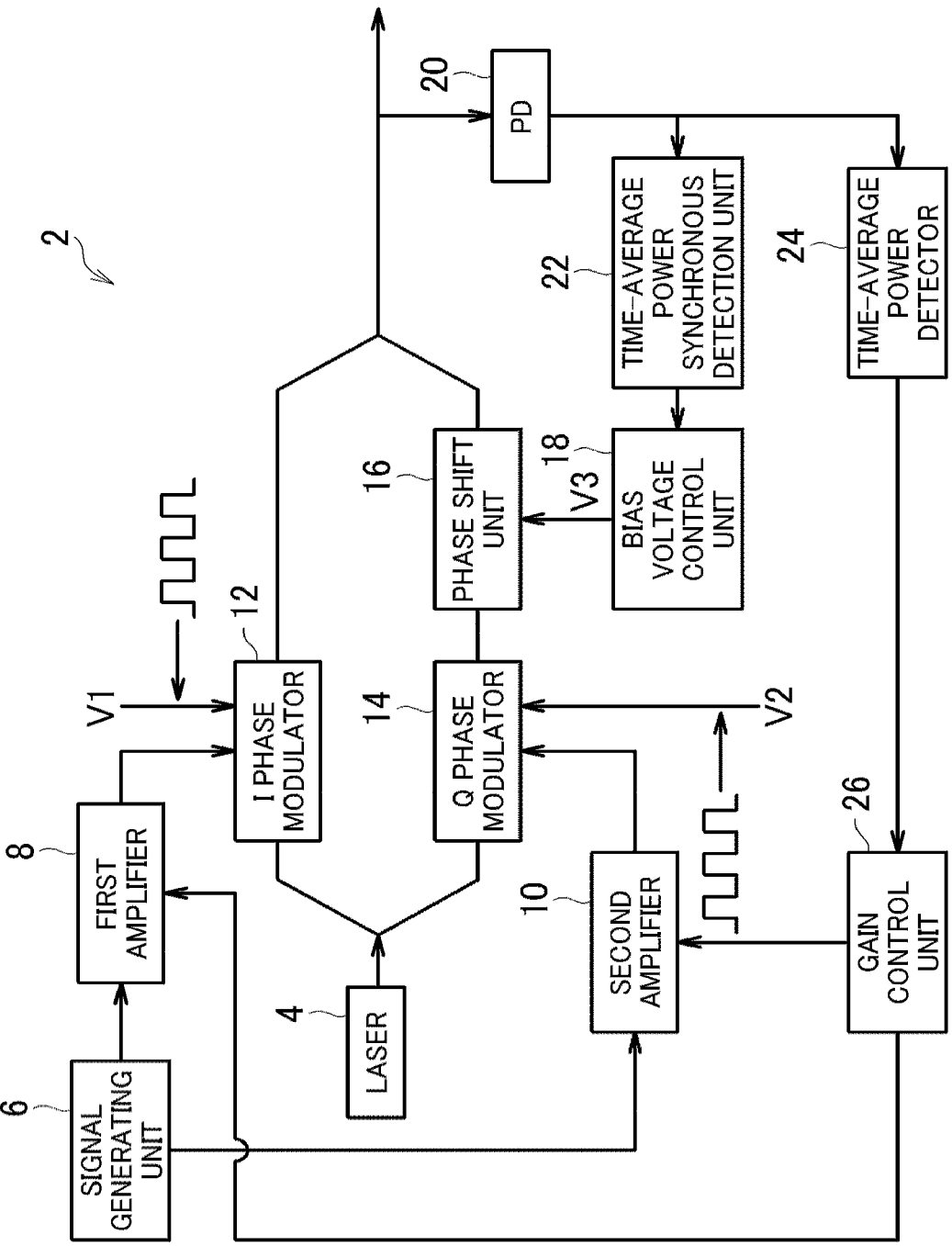
FIG. 1 is a diagram illustrating the configuration of an optical output module according to an embodiment of the present invention.
Figure 2:
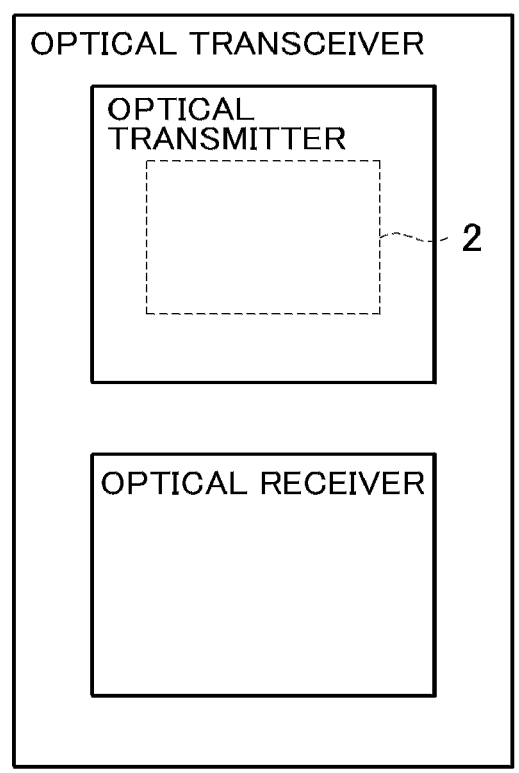
FIG. 2 is a diagram illustrating the optical transceiver according to an embodiment of the present invention.

FIG. 1 is a diagram illustrating the configuration of an optical output module 2 according to an embodiment of the present invention. The optical output module 2, for example, is provided in an optical transceiver provided with an optical transmitter and an optical receiver. That is, as shown in FIG. 2 illustrating an example of the optical transceiver, the optical output module 2 is provided in the optical transmitter of the optical transceiver. The optical transmitter includes an RZ-DQPSK optical transmitter provided with the optical output module 2 and an RZ modulator, an NRZ-DQPSK optical transmitter in which an RZ modulator is not provided, or the like.

As shown in FIG. 1, the optical output module 2 includes a laser 4. The laser 4 outputs an optical signal. The optical signal is CW (Continuous Wave) light.

In addition, the optical output module 2 includes a signal generating unit 6. The signal generating unit 6 generates a driving signal corresponding to a digital signal. More specifically, the signal generating unit 6 outputs successive two bits of a data stream as parallel signals in two channels.

In addition, the optical output module 2 includes a first amplifier 8. The first amplifier 8 amplifies the driving signal at an amplification factor set at the time of manufacturing the optical output module 2. By amplifying the driving signal, the first amplifier 8 generates a first modulation signal. Here, the amplification factor of the first amplifier 8 is set so that the amplitude of the first modulation signal is less than half the reference voltage Vs. In the present embodiment, the amplitude of the first modulation signal is "0.45×Vs", 0.45 times the reference voltage Vs. Here, a quarter of the reference voltage Vs is equivalent to the so-called half-wave voltage Vπ. Here, the amplitude is the difference between the maximum value and the minimum value of the signal voltage.

Description will be given of the reference voltage Vs later. In addition, description will also be given of the meaning of the fact that the amplitude of the first modulation signal is less than half the reference voltage Vs.

In addition, the optical output module 2 includes a second amplifier 10. The second amplifier 10 amplifies the driving signal at an amplification factor set at the time of manufacturing the optical output module 2. By amplifying the driving signal, the second amplifier 10 generates a second modulation signal. Here, the amplification factor of the second amplifier 10 is set so that the amplitude of the second modulation signal is less than half the reference voltage Vs (second voltage period). In the present embodiment, the amplitude of the second modulation signal is "0.45×Vs", 0.45 times the reference voltage Vs which is the same as the first modulation signal.

In addition, description will also be given of the meaning of the fact that the amplitude of the second modulation signal is less than half the reference voltage Vs.

In addition, the optical output module 2 includes an I phase modulator 12 and a Q phase modulator 14. The I phase modulator 12 and the Q phase modulator 14 are zero chirp Mach-Zehnder type LN modulators, for example.

The I phase modulator 12 modulates the phase of the optical signal output from the laser 4 based on the bias voltage V1 in which the first modulation signal and the first pilot signal which is a low-frequency signal are inherent. Further, the Q phase modulator 14 modulates the phase of the optical signal output from the laser 4 based on the bias voltage V2 in which the second modulation signal and the second pilot signal are inherent. Further, the second pilot signal is a low-frequency signal in which the phase of the first pilot signal is shifted "90×n"° (n is an odd number), and here, a low-frequency signal in which the phase of the first pilot signal is shifted 90° is used as the second pilot signal. In addition, for example, instead of different phases in the first pilot signal and the second pilot signal, the periods thereof may be different from each other. The first pilot signal and the second pilot signal may be different signals. In addition, here, the first pilot signal and the second pilot signal are set as rectangular waves; however, they may be sine waves or triangular waves.

FIG. 3A is a diagram showing the relationship between the optical electric field of light passing through the I phase modulator 12 (optical electric field after the phase of the light is modulated by the I phase modulator 12) and the voltage used by the I phase modulator 12 in the phase modulation of the light. The vertical axis shows the optical electric field and the horizontal axis shows the voltage. In addition, FIG. 3A also shows the relationship between the optical electric field of light passing through the Q phase modulator 14 (optical electric field after the phase of the light is modulated by the Q phase modulator 14) and the voltage used by the Q phase modulator 14 in the phase modulation of the light.

As shown in FIG. 3A, the optical electric field is changed sinusoidally and periodically according to the voltage. The above-described reference voltage Vs is a voltage period in which the optical electric field is changed and is equivalent to four times the half-wave voltage Vπ. A positive optical electric field corresponds to an optical phase of 0° and a negative optical electric field corresponds to an optical phase of 180°. In addition, as shown in the same figure, the optical electric field becomes "0" when the voltage is V0. Here, an ABC (Automatic Bias Control) circuit (not shown) controls the bias voltage V1 and the bias voltage V2 so that the time-average power detected by the PD 20 (described later) is maximized, whereby the bias voltage V1 and the bias voltage V2 are set to V0.

Figure 3B:
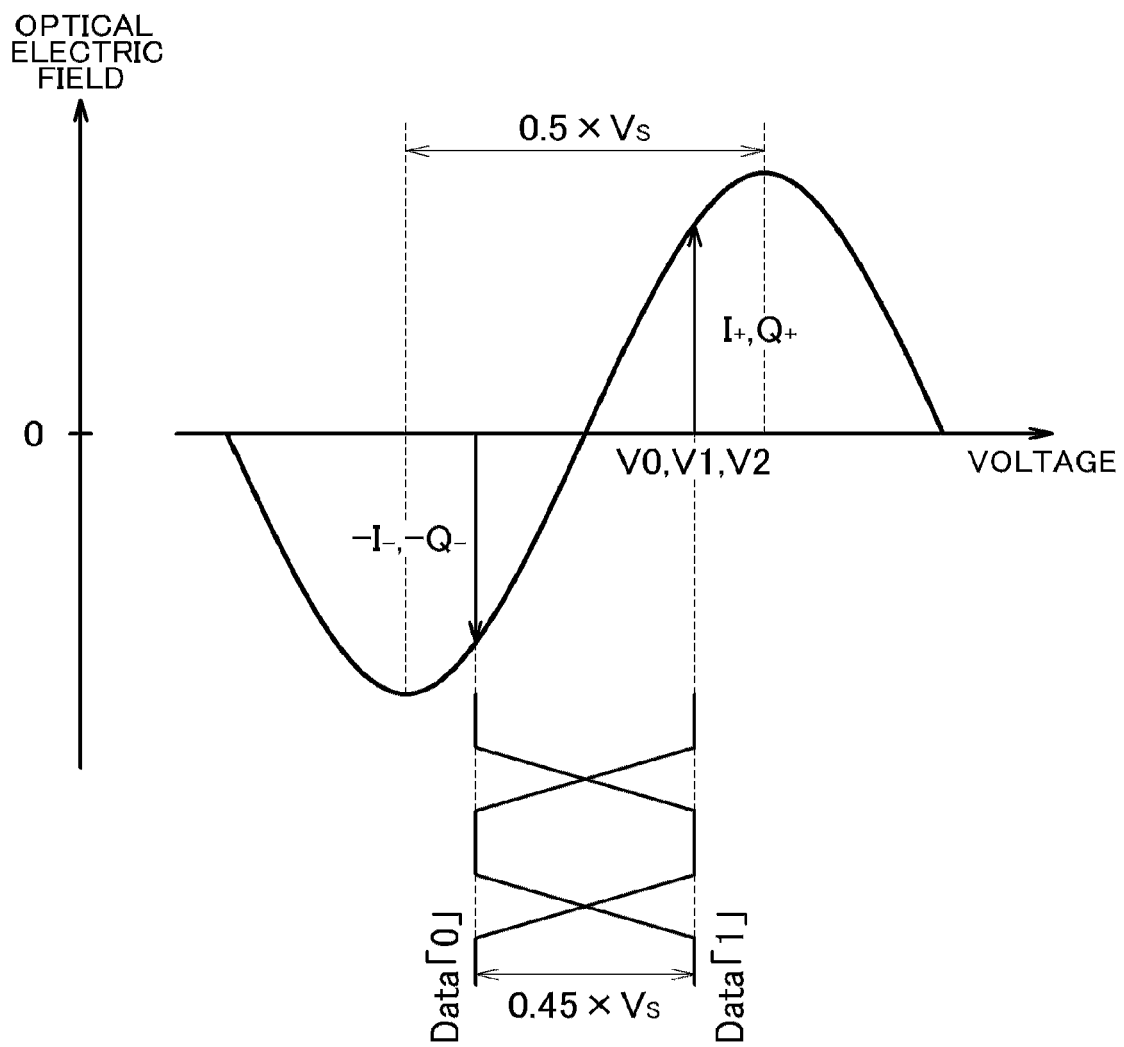
FIG. 3B is a diagram showing the relationship between the optical electric field and voltage.

When the first modulation signal is inherent in the bias voltage V1, as shown in FIG. 3B, the optical electric field becomes "$I_+$" when the data is "1" and becomes "$-I_-$" when the data is "0". Here, "$I_+$" and "$I_-$" together make "I". Similarly, when the second modulation signal is inherent in the bias voltage V2, the optical electric field becomes "$Q_+$" when the data is "1" and becomes "$-Q_-$" when the data is "0". Here, "$Q_+$" and "$Q_-$" together make "Q".

Figure 3D:
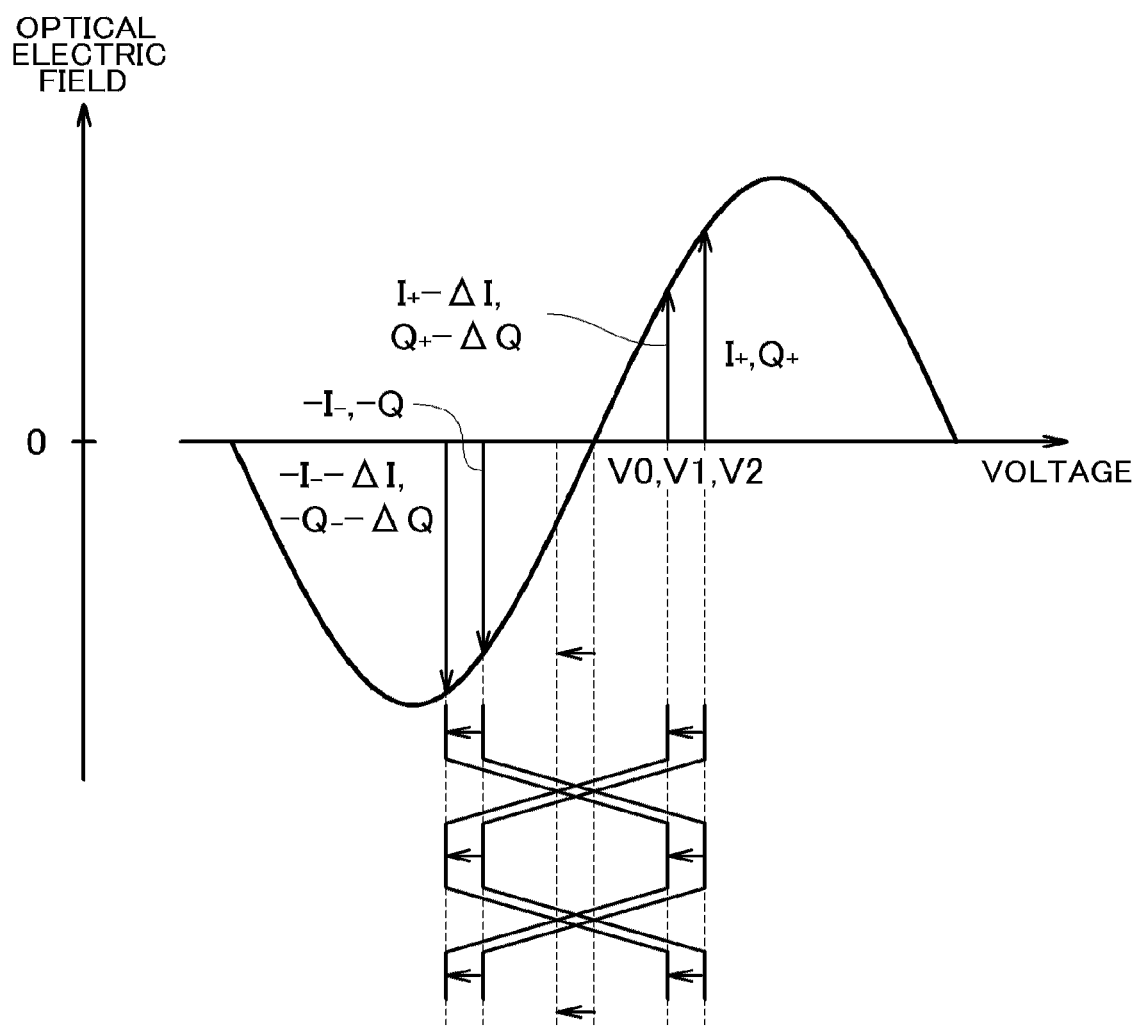
FIG. 3D is a diagram showing the relationship between the optical electric field and voltage.

As described above, a first pilot signal as well as the first modulation signal is also inherent in the bias voltage V1. Therefore, when the voltage of the first pilot signal is a positive voltage, as shown in FIG. 3C, the optical electric field becomes "$I_+ + \Delta I$" when the data is "1" and becomes "$-I_- + \Delta I$" when the data is "0". On the other hand, when the voltage of the first pilot signal is a negative voltage, as shown in FIG. 3D, the optical electric field becomes "$I_+ - \Delta I$" when the data is "1" and becomes "$-I_- - \Delta I$" when the data is "0". In addition, if the voltage of the pilot signal is positive, it indicates that the voltage of the pilot signal is higher than the time-average of the voltage of the pilot signal, and, if the voltage of the pilot signal is negative, it indicates that the voltage of the pilot signal is lower than the time-average.

In addition, as described above, a second pilot signal as well as the second modulation signal is also inherent in the bias voltage V2. Therefore, when the voltage of the second pilot signal is a positive voltage, as shown in FIG. 3C, the optical electric field becomes "$Q_+ + \Delta Q$" when the data is "1" and becomes "$-Q_- + \Delta Q$" when the data is "0". On the other hand, when the voltage of the second pilot signal is a negative voltage, as shown in FIG. 3D, the optical electric field becomes "$Q_+ - \Delta Q$" when the data is "1" and becomes "$-Q_- - \Delta Q$" when the data is "0".

In addition, the optical output module 2 includes a phase shift unit 16. The phase shift unit 16 shifts the phase of the optical signal of which the phase is modulated by the Q phase modulator 14 so that the phase difference between the optical signal input to the I phase modulator 12 and the optical signal input to the Q phase modulator 14 is set to "90×m"°. "m" is an odd number, and here, "m" is "1". More specifically, the phase shift unit 16 modulates the phase based on the bias voltage V3.

In addition, the optical output module 2 includes a bias voltage control unit 18. The bias voltage control unit 18 may be realized by a microcomputer, for example. The bias voltage control unit 18 controls the bias voltage V3 so that the phase shift amount becomes 90° according to the phase shift unit 16.

The optical signal of which the phase is modulated by the I phase modulator 12 and the optical signal of which the phase is modulated by the Q phase modulator 14 and of which the phase is shifted by the phase shift unit 16 are combined to become a DQPSK (Differential Quadrature Phase Shift Keying) optical signal and are output from the optical output module 2. In addition, the DQPSK optical signal is received by a photodiode 20 (hereinafter, PD 20).

In addition, the optical output module 2 includes a time-average power synchronous detection unit 22 in order to get the bias voltage control unit 18 control the bias voltage V3 so that the phase shift amount according to the phase shift unit 16 becomes 90°. The time-average power synchronous detection unit 22 may be realized by a microcomputer, for example. Description will be given below of the operation of the time-average power synchronous detection unit 22.

In addition, the optical output module 2 also includes a time-average power detector 24, a gain control unit 26 and storage means (not shown). In the present embodiment, the time-average power detector 24 and the gain control unit 26 are formed to operate at the time of manufacturing the optical output module 2 and may be realized by a microcomputer, for example. Description will be given of the time-average power detector 24 and the gain control unit 26 when description is given regarding the operation during the manufacturing of the optical output module 2.

Below, as a premise for the description regarding the operation of the bias voltage control unit 18 and the time-average power synchronous detection unit 22 for controlling the bias voltage V3 so that the phase shift amount becomes 90°, description will be given of the principles of DQPSK phase modulation.

Figure 4A:
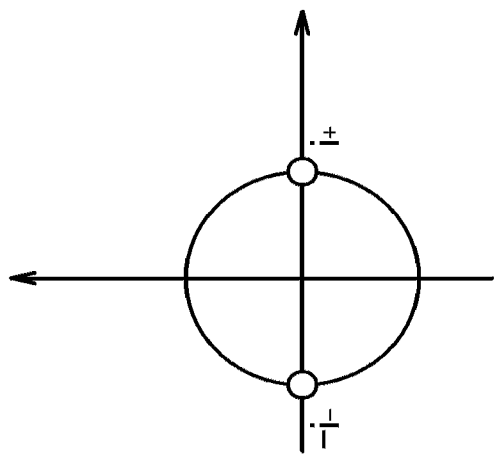
FIG. 4A is a diagram showing a constellation.
Figure 4B:
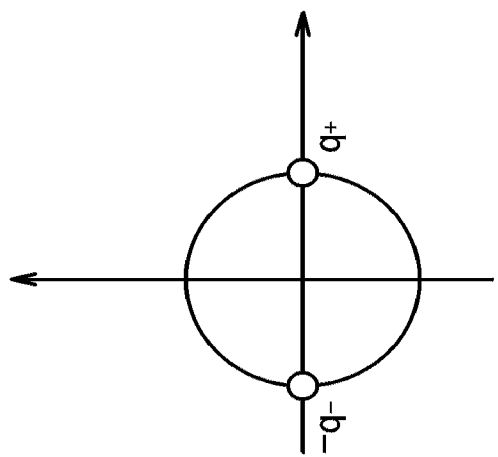
FIG. 4B is a diagram showing a constellation.
Figure 4C:
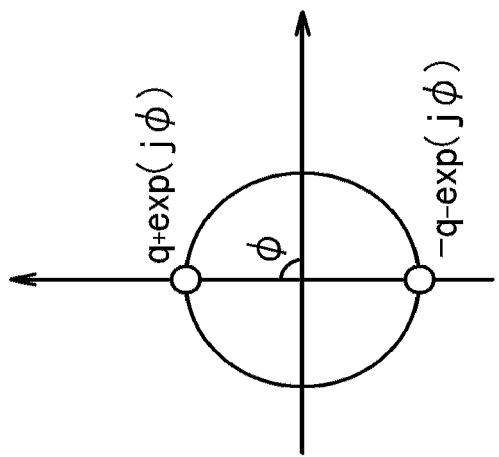
FIG. 4C is a diagram showing a constellation.

When the state of the optical signal is expressed using a constellation in which the intensity and phase of the optical electric field are expressed in a complex plane, the optical signal modulated by the I phase modulation unit 12 becomes an optical signal of which the optical phase is 0° and the constellation thereof is as shown in FIG. 4A. Further, the optical signal directly after being modulated by the Q phase modulation unit 14 becomes an optical signal of which the optical phase is 180° and the constellation thereof is as shown in FIG. 4B. The optical electric field intensity when the optical phase is 180° is set to "$q_-$" and "$i_-$" and the optical electric field intensity when the optical phase is 0° is set to "$q_+$" and "$i_+$". In the phase shift unit 16, the constellation shown in FIG. 4B is rotated $\phi$ ($\phi$=90×m)° (refer to FIG. 4C).

Figure 4D:
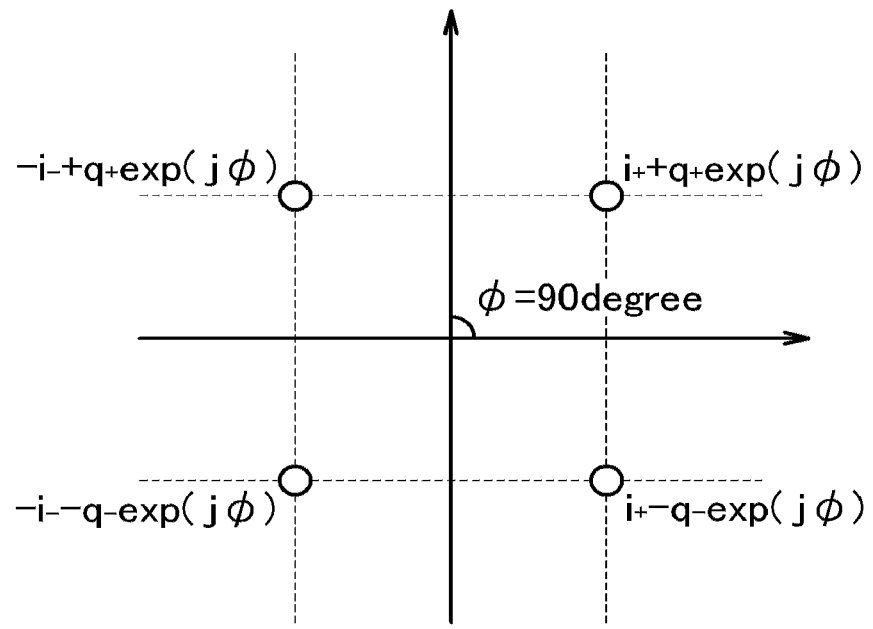
FIG. 4D is a diagram showing a constellation.

FIG. 4D shows the constellation of a DQPSK optical signal when the phase shift $\phi$=90°. When four states are complexly expressed and the respective states become "$i_+ + q_+ \exp(j\phi)$", "$-i_+ + q_+ \exp(j\phi)$", "$-i_- - q_- \exp(k\phi)$", and "$i_+ - q_- \exp(j\phi)$", and, in a case where $\phi$ is "90×m"°, there are four phase states of 45°, 135°, 225°, and 315°.

When the mark rate is respectively quartered by four symbols, the time-average power P of the DQPSK optical signal is expressed by the formula below.

$$P = \tfrac{1}{4}(|i_+ + q_+ \exp(j\phi)|^2 + |-i_- \exp(j\phi)|^2 + |i_+ - q_- \exp(j\phi)|^2) = \tfrac{1}{2}[i_+^2 + i_-^2 + q_+^2 + q_-^2 + (i_+ - i_-)(q_+ - q_-)\cos\phi]$$

According to this formula, when "$i_+ - i_- = 0$" and "$q_+ - q_- = 0$", regardless of the phase shift amount $\phi$, P becomes a determined value K ($K=(i_+^2+i_-^2+q_+^2+q_-^2)/2$). Therefore, when only the first modulation signal is inherent in the bias voltage V1 or only the second modulation signal is inherent in the bias voltage V2, since "$I_+$" which is "$i_+$" becomes the same value as "$I_-$" which is "$i_-$" and "$Q_+$" which is "$q_+$" becomes the same value as "$Q_-$" which is "$q_-$", regardless of the phase shift amount $\phi$, P becomes a determined value K. In such a case, adjusting the phase shift amount $\phi$ to 90° by detecting the time-average power P is difficult.

On this point, in the optical output module 2, the first pilot signal and the second pilot signal are inherent. Therefore, in a case where the voltage of the first pilot signal and the voltage of the second pilot signal are both positive (a case where "$q_+$" is "$Q_+ + \Delta Q$", "$q_-$" is "$-Q_- + \Delta Q$", "$i_+ + \Delta I$", and "$i_-$" is "$-I_- + \Delta I$") and a case where the voltage of the first pilot signal and the voltage of the second pilot signal are both negative (a case where "$q_+$" is "$Q_+ - \Delta Q$", "$q_-$" is "$-Q_- - \Delta Q$", "$i_+$" is "$I_+ - \Delta I$", and "$i_-$" is "$-I_- - \Delta I$"), the time-average power P becomes "$K1 + 2 \times \Delta I \times \Delta Q \times \cos\phi$". That is, at a timing at which the positivity and negativity of the voltage of the first pilot signal and the voltage of the second pilot signal become the same, the time-average power P (below P1) becomes "$K1 + 2 \times \Delta I \times \Delta Q \times \cos\phi$". In addition, K1 is "$(I_+^2 + I_-^2 + Q_+^2 + Q_-^2)/2$".

Further, in a case where the voltage of the first pilot signal is positive and the voltage of the second pilot signal is negative (a case where "$q_+$" is "$Q_+ - \Delta Q$", "$q_-$" is "$-Q_- - \Delta Q$", "$i_+$" is "$I_+ + \Delta I$", and "$i_-$" is "$-I_- + \Delta I$") and a case where the voltage of the first pilot signal is negative and the voltage of the second pilot signal is positive (a case where "$q_+$" is "$Q_+ + \Delta Q$", "$q_-$" is "$-Q_- + \Delta Q$", "$i_+$" is "$I_+ - \Delta I$", and "$i_-$" is "$-I_- - \Delta I$"), the time-average power P becomes "$K1 - 2 \times \Delta I \times \Delta Q \times \cos\phi$". That is, at a timing at which the positivity and negativity of the voltage of the first pilot signal and the voltage of the second pilot signal become opposite, the time-average power P (below P2) becomes "$K1 - 2 \times \Delta I \times \Delta Q \times \cos\phi$".

Figure 5:
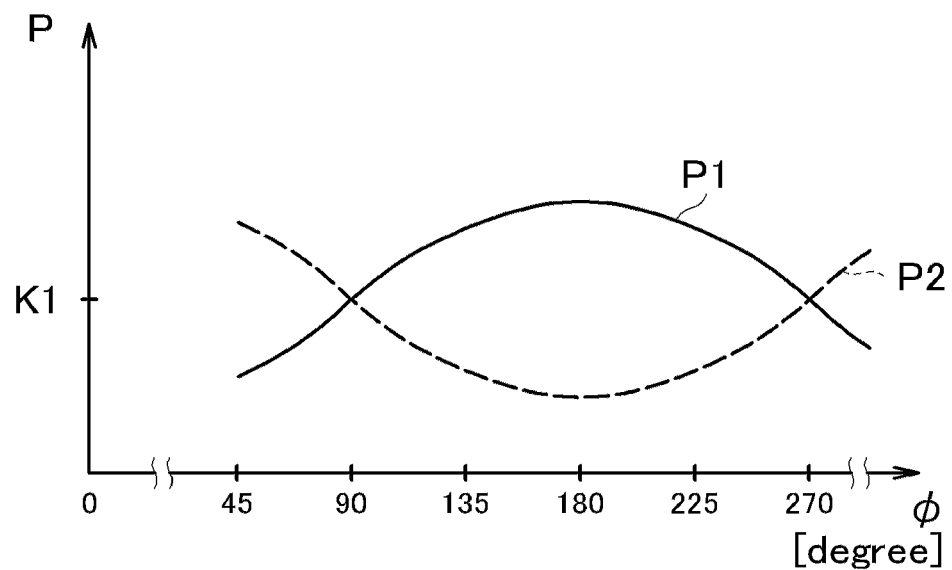
FIG. 5 is a diagram showing the relationship between the amount of the phase shift and the time-average power.
Figure 6:
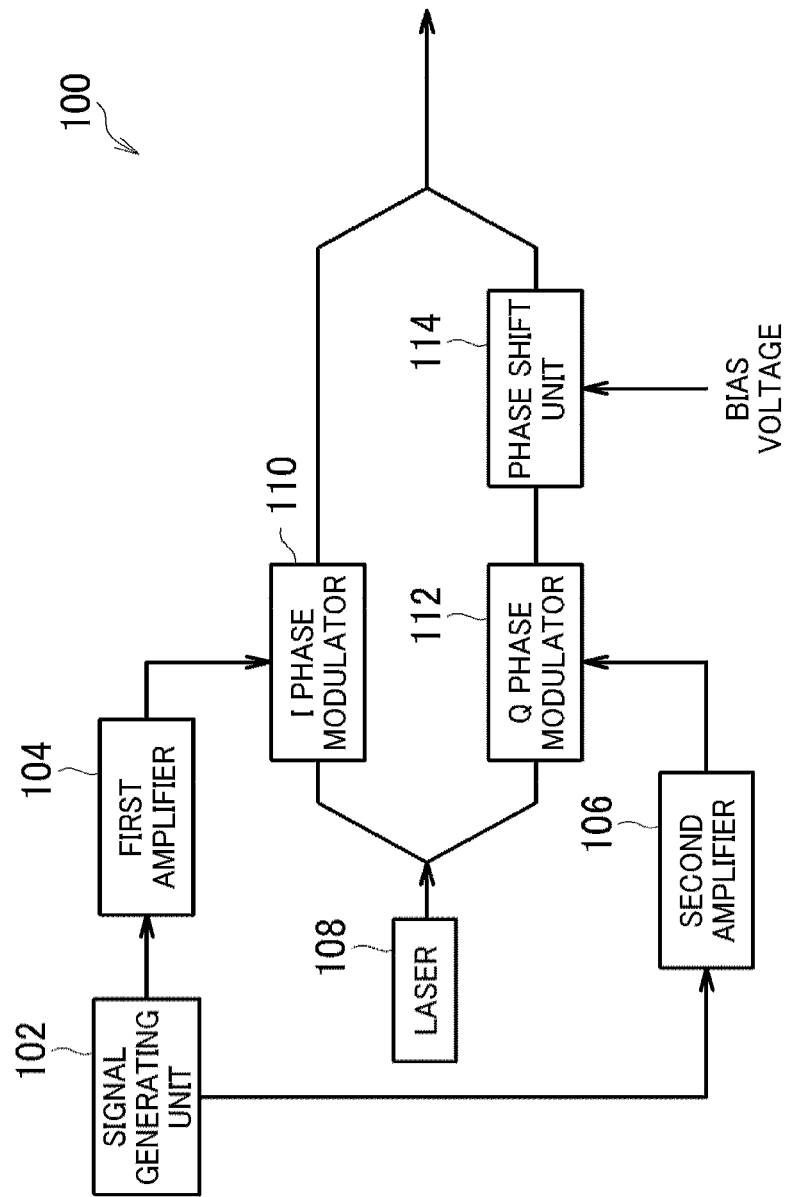
FIG. 6 is a diagram illustrating the basic configuration of a DQPSK optical transmitter.
Figure 7:
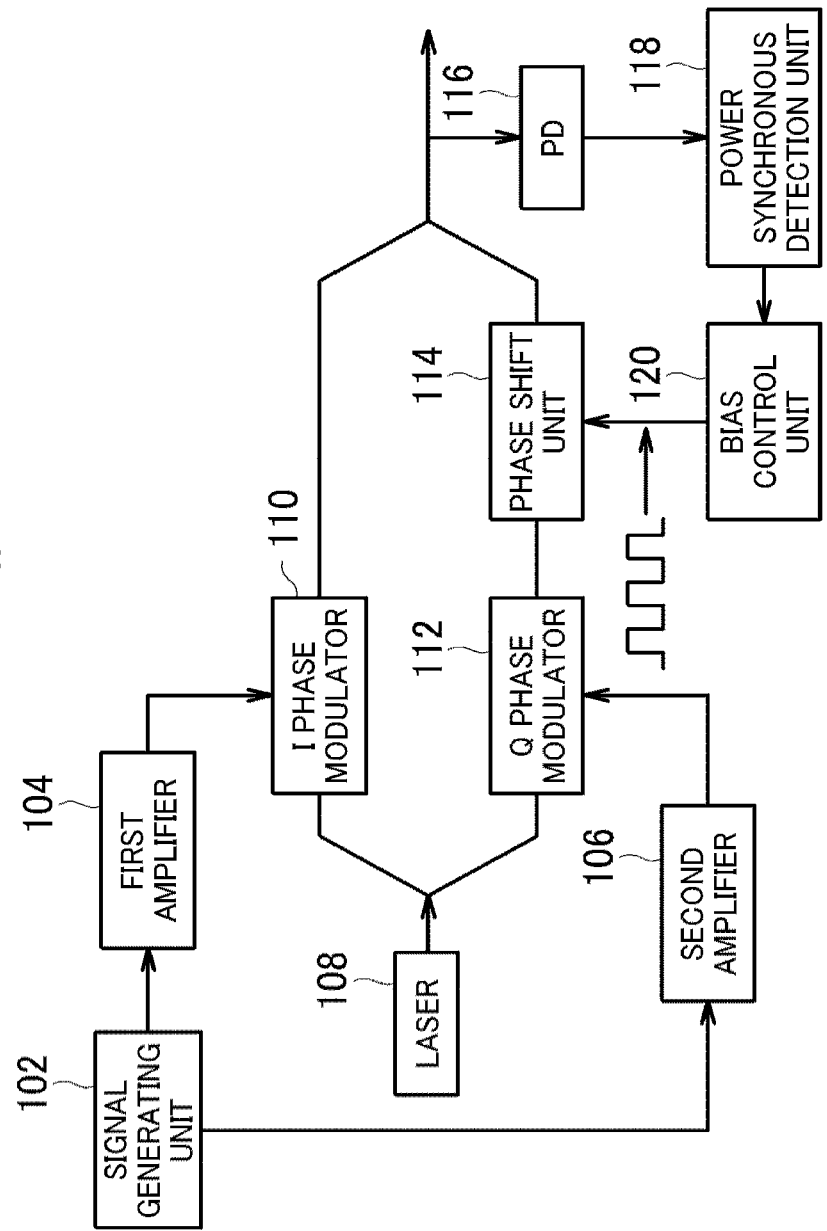
FIG. 7 is a diagram illustrating the configuration of the DQPSK optical transmitter.

FIG. 5 illustrates the relationship between the phase shift amount $\phi$ and the time-average power P1 and the time-average power P2.

As can be understood from FIG. 5, when the amount of the phase shift $\phi$ is "90×m", the difference between P1 and P2 is 0 and P1 and P2 together become K1. Therefore, when the bias voltage V3 is adjusted so that P1 and P2 are the same, it is possible to adjust the phase shift amount $\phi$ to "90×m"°.

Therefore, in the optical output module 2, the time-average power synchronous detection unit 22 detects a signal from the PD 20 synchronized with the frequency of the first pilot signal, whereby the repetition of the time-average power P1 and the time-average power P2 is detected.

Thus, the bias voltage control unit 18 repeatedly controls the bias voltage V3 based on the detection result of the time-average power synchronous detection unit 22 so that the difference between the time-average power P1 and the time-average power P2 is reduced.

In this manner, even without giving the pilot signal to the bias voltage V3, it is possible to adjust the amount of the phase shift φ to "90×m"°. Therefore, it is possible to do without using the RF (Radio Frequency) power detector or the like and to suppress the increase in the scale of the hardware and the manufacturing cost. It is sufficient if the first pilot signal and the second pilot signal satisfy conditions in which a period where the voltage of the first pilot signal and the voltage of the second pilot signal are both positive or negative and a period where one of the first pilot signal and the second pilot signal is positive and the other is negative are generated.

Incidentally, when the amplitude of the first modulation signal and the second modulation signal is "0.5×Vs" which is half the reference voltage Vs (refer to FIG. 3B), the displacements ΔQ and ΔI (refer to FIG. 3C and FIG. 3D) of the optical electric field according to the first pilot signal and the second pilot signal become too small and there is a possibility of problems with the adjustment of the amount of the phase shift φ.

On this point, in the optical output module 2, the amplification factors of the first amplifier 8 and the second amplifier 10 are set so that the amplitude of the first modulation signal and the second modulation signal becomes "0.45×Vs" which is less than "0.5×Vs". Therefore, it is ensured that the displacements ΔQ and ΔI of the optical electric field become comparatively large, and, as a result, the adjustment precision of the amount of the phase shift φ is ensured. In addition, in a DWDM (Dense Wavelength Division Multiplexing) system, there is almost no deterioration of the OSNR (Optical Signal-to-Noise Ratio) characteristic and no influence on the optical transmission characteristic. Here, the amplitude of the first modulation signal and the second modulation signal is preferably "0.35×Vs" or more to "0.45×Vs" or less so that malfunction does not occur in relation to the control of the bias voltage V1 and the bias voltage V2.

Here, that the amplification factor of the first amplifier 8 is set in advance during the manufacturing of the optical output module 2 so that the amplitude of the first modulation signal becomes "0.45×Vs" and that the amplification factor of the second amplifier 10 is set in advance during the manufacturing of the optical output module 2 so that the amplitude of the second modulation signal becomes "0.45×Vs" have already been stated. Here, description will be given of the operation during the manufacturing of the optical output module 2 so as to set the amplification factor of the first amplifier 8 so that the amplitude of the first modulation signal becomes "0.45×Vs" and set the amplification factor of the second amplifier 10 so that the amplitude of the second modulation signal becomes "0.45×Vs". Further, below, there are times where the first modulation signal and the second modulation signal are collectively referred to as modulation signals.

During the manufacturing, only the first modulation signal is given to the bias voltage V1 and the I phase modulator 12 modulates the phase based not on the bias voltage V1 to which the first modulation signal and the first pilot signal are given but on the bias voltage V1 to which only the first modulation signal is given. Further, during the manufacturing, only the second modulation signal is given to the bias voltage V2 and the Q phase modulator 14 modulates the phase based not on the bias voltage V2 to which the second modulation signal and the second pilot signal are given but on the bias voltage V2 to which only the second modulation signal is given.

For this reason, since the first pilot signal and the second pilot signal are not given, the time-average power P of the DQPSK signal becomes the above-described K1, that is, "$I^2+Q^2$". However, I changes according to the amplification factor of the first amplifier 8 and Q changes according to the amplification factor of the second amplifier 10. Therefore, the time-average power P is changed according to the amplification factor of the first amplifier 8 and the amplification factor of the second amplifier 10.

That is, when the amplification factor of the second amplifier 10 is fixed, in other words, when the amplitude of the second modulation signal is fixed, in a case where the amplitude of the first modulation signal becomes "0.5×Vs" (a case where the amplification factor of the first amplifier 8 is such that the amplitude of the first modulation signal becomes "0.5×Vs"), the time-average power P becomes the maximum. Further, when the amplification factor of the first amplifier 8 is fixed, in other words, when the amplitude of the first modulation signal is fixed, in a case where the amplitude of the second modulation signal becomes "0.5×Vs" (a case where the amplification factor of the second amplifier 10 is such that the amplitude of the second modulation signal becomes "0.5×Vs"), the time-average power P becomes the maximum.

This property is used.

That is, in an arbitrary period (below referred to as the first period), the gain control unit 26 fixes one of the amplification factors of the first amplifier 8 and the second amplifier 10, and the gain control unit 26 continues to change the other amplification factor, and, in an arbitrary period after the first period (below referred to as the second period), the gain control unit 26 continues to change the above-described one amplification factor of a state where the other amplification factor is fixed. Here, in the first period, the gain control unit 26 supplies a constant amplitude control signal to the second amplifier 10 while continuing to change the amplitude control signal supplied to the first amplifier 8 within a predetermined range. In addition, in the second period, the gain control unit 26 supplies a constant amplitude control signal to the first amplifier 8 while continuing to change the amplitude control signal supplied to the second amplifier 10 within a predetermined range. Here, the amplitude control signal is a signal for controlling the amplification factor.

The time-average power P is repeatedly detected by the time-average power detector 24 and the time-average power P in the first period and the time-average power P in the second period are stored in storage means.

After the passing of the first period, the gain control unit 26 sets the amplification factor of the first amplifier 8 based on the characteristic amounts relating to the change of the time-average power P in the first period stored in the storage means. That is, the gain control unit 26 sets the value of the amplitude control signal to be supplied to the first amplifier 8 in the future. In addition, after the passing of the second period, the gain control unit 26 sets the amplification factor of the second amplifier 10 based on the characteristic amounts relating to the change of the time-average power P in the second period stored in the storage means. That is, the gain control unit 26 sets the value of the amplitude control signal to be supplied to the second amplifier 10 in the future.

Below, description will be given of an example of the setting method of the amplification factor, using a case where the amplification factor of the first amplifier 8 is set. For example, with reference to the time-average power in the first period stored in the storage means, the gain control unit 26 specifies Smax which is the value of the amplitude control signal S when the time-average power P is the maximum value. In addition, the time-average power P in the first period is plotted with the amplitude control signal S set to the horizontal axis. Thus, the curvature radius ρ of a quadratic curve drawn from the results of the plotting is calculated.

In the storage means, each of a plurality of curvature radii ρc which are candidates for the curvature radius ρ and the recommended decrease amount ΔS of the amplitude control signal S are correlated and stored. The curvature radii candidates ρc and the recommended decrease amount ΔS are set with reference to a simulation result performed in advance. That is, for the curvature radii candidates ρc and the recommended decrease amount ΔS, when the amplitude control signal S is set to "Smax−ΔS" in a case where the curvature radius ρ is ρc, the amplitude of the modulation signal is set to become "0.45×Vs".

In this manner, when the curvature radius ρ is calculated, the gain control unit 26 reads out the recommended decrease amount ΔS correlated with the curvature radius candidate ρc which is closest to the curvature radius ρ among the plurality of curvature radius candidates ρc, and sets the amplitude control signal S to "Smax−ΔS". Thus, the gain control unit 26 sets the amplification factor of the first amplifier 8 so that the amplitude of the first modulation signal becomes "0.45×Vs". Further, the gain control unit 26 sets the amplification factor of the second amplifier 10 in the second period in the same manner as the above.

In addition, when the amplification factor of the second amplifier 10 is set, it seems possible to use the recommended decrease amount ΔS used to set the amplification factor of the first amplifier 8. However, since there are individual differences in the characteristics of amplifiers, when using the same recommended decrease amount ΔS in the first amplifier 8 and the second amplifier 10, the amplitude of both the first modulation signal and the second modulation signal is not necessarily becoming "0.45×Vs". In some cases, the output amplitude of the first amplifier 8 and the output amplitude of the second amplifier 10 become unbalanced with respect to the extinction characteristics of the I phase modulator 12 and the Q phase modulator 14, resulting in the deterioration of the transmission characteristic. On this point, in the optical output module 2, the recommended decrease amount ΔS is specified while taking each of the characteristics of the first amplifier 8 and the second amplifier 10 into consideration. That is, the recommended decrease amount ΔS is specified individually with respect to each of the first amplifier 8 and the second amplifier 10. As a result, the occurrence of such a situation is suppressed.

As can be understood from the contents of the above, the bias voltage control unit 18 included in the optical output module 2 is capable of controlling the amount of the phase shift φ between the output light from the I phase modulator 12 and the output light from the phase shift unit 16 to "90×m"°. Here, "m" is an odd number. In addition, the bias voltage control unit 18 may perform control so as to enter a predetermined state of a state of m=4k+1 (k is an integer) and a state of m=4k+3. In the following, description will be given of the control performed by the bias voltage control unit 18 using an example in which the amount of the optical phase shift φ is selectively controlled between 90° (m=1) and 270° (m=3) as a representative example.

According to FIG. 5, when the phase shift amount φ is between 90° and 270°, the time-average power P1 is greater than the time-average power P2. To put this in a formula, in 90×(4k+1)<φ<90×(4k+3), P1>P2, and, in 90×(4k+3)<φ<90× (4k+5), P1<P2. Here, in the feedback control of the phase shift unit 16, the bias voltage control unit 18 selects whether to increase or decrease the amount of the phase shift φ according to which of P1 and P2 is greater. In this manner, it is possible to perform control so as to enter a predetermined state of a state in which the phase shift amount φ is m=4k+1 and a state of m=4k+3.

As a more specific example, description will be given of a case where the amount of the phase shift φ set as a target in advance is set to 90×(4k+3)° (for example, 270°). When the bias voltage control unit 18 performs control so that the difference between P1 and P2 becomes "0", the bias voltage is controlled so that the amount of the phase shift φ becomes high in a case where P1-P2 is positive and the bias voltage is controlled so that the amount of the phase shift φ becomes low in a case where P1-P2 is negative. Accordingly, as can be understood from FIG. 5, when P1-P2 becomes 0, it is always possible to perform control so that φ=90×(4k+3). In addition, by reversing the increasing or decreasing of the amount of the phase shift φ, it is possible to perform control so that φ=90× (4k+1). In the present embodiment, since the modulator configuring the phase shift unit 16 controls the amount of the phase shift φ with a DC bias voltage, control is performed to increase or decrease the bias voltage according to the positivity or negativity of P1-P2. Here, description has been given of the optical transmission system including the optical output module 2 and the optical receiver 30; however, instead of the optical output module 2, it is possible to use an optical transceiver having the functions of the optical output module 2 and the optical receiver 30, and an optical transceiver may be used instead of the optical receiver 30.

When the above-described optical output module 2 is used, it is possible to obtain an optical transmission system not in the related art. FIG. 8 is a diagram illustrating the optical transmission system according to an embodiment of the present invention. The optical transmission system includes an optical output module 2 and an optical receiver 30. The optical output module 2 shown in FIG. 8 has the same configuration as that shown in FIG. 1. During manufacturing, the optical output module 2 is set to control the phase shift amount φ in the phase shift unit 16 to become 90×(4k+1)° (when m=4K+1, for example, 90°), or control the phase shift amount φ in the phase shift unit 16 to become 90×(4k+3)° (when m=4K+3, for example, 270°). Further, the optical phase signal output from the optical output module 2 is transmitted via optical fiber and received by the optical receiver 30 provided with a plurality of demodulators. The optical receiver 30 has an I phase demodulator 32, a Q phase demodulator 34 and a data processing unit 36. The I phase demodulator 32 and the Q phase demodulator 34 respectively demodulate the optical phase signal to an electric intensity signal (signal showing data). The data processing unit 36 provided at a stage after the I phase demodulator 32 and the Q phase demodulator 34 restores the transmitted signal based on the electric intensity signal.

The optical output module 2 in the present embodiment is capable of determining the phase shift amount φ in advance as 90° or 270°. Then, when φ=90°, the I-data from the I phase demodulator 32 and the Q-data from the Q phase demodulator 34 are demodulated, and, when φ=270°, the Q-data from the I phase demodulator 32 is demodulated and the I-data from the Q phase demodulator 34 is demodulated. Therefore, the data processing unit 36 may simply perform processing of a mode set in advance from among a mode where data in which two bits of data corresponding to the electric intensity signals output from the I phase demodulator 32 and the Q phase demodulator 34 respectively are arranged in a certain direction is output and a mode where data arranged so that the two bits of data are replaced (data swap) are output. For example, when φ is 90° (strictly, m=4k+1), the data swap is unnecessary, and, when φ is 270° (strictly, m=4k+3), the data swap may be performed.

On the other hand, for example, an optical output module 100 of the related art was not capable of performing control to fix the phase shift amount φ to one of 90° and 270°. Therefore, in the optical receiver of the related art, when data is restored from the electric intensity signal, it is not known which one of the I phase demodulator 32 or the Q phase demodulator 34 outputs I-Data (or Q-Data). Accordingly, in the optical receiver of the related art, there was a need for a process to select which of either of a case of performing data swap or a case of not performing the swap was correct or not. In determining whether or not such a combination was correct, there was a need for a process to confirm the bit error rate or the like, for example. More precisely, there was a need to determine which combination was correct of all the combinations of a case where data swap is performed or not, a case where bit shift is performed or not, and a case where inverting is performed or not.

That is, when performing data processing with respect to all the combinations of a case where data swap is performed or not, a case where bit shift is performed or not, and a case where inverting is performed or not, the optical receiver 30 relating to the present embodiment reduces the number of combinations where determination is necessary in order to be able to determine in advance whether or not data swap is to be performed. Accordingly, it is possible to simplify the demodulation algorithm in the optical receiver 30 and to shorten the demodulation time. By using the above-described optical output module 2, it is possible to build an optical transmission system provided with an optical receiver 30 having a shorter restoration time. For example, this optical transmission system is capable of starting actual communication within a shorter time than in the related art at the time of the initial start-up or at the time of return from the shutdown of the optical output module.

In addition, by using the optical output module 2 according to an embodiment of the present invention, the following effects can also be obtained. Since control is performed so that φ=90° or 270° by detecting the low frequency component of the signal, the control of the amount of the phase shift φ of the related art has a problem in that it is not possible to control the phase shift amount when the low frequency component is small or not included in the signal output from the signal generating unit 102. For example, when PBRS (Pseudorandom it Sequence) data is used, since the low frequency components are reduced along with reducing the number of PN stages, control becomes difficult. On the other hand, the present invention does not depend on the signal frequency band in order to control the amount of phase shift according to the detected time-average power. Thus, when the signal output from the signal generating unit 102 is PBRS data, a constant detection signal is obtained regardless of the PN stage, and it is possible to perform control even in a case where the number of PN stages is small or a case of using an alternating signal of 01. Here, the alternating signal of 01 is a signal in which 0 and 1 are lined up alternately such as 010101 . . . .

The present invention may be applied to the phase shift control of another optical multivalue phase modulation transmitter. For example, the present invention may be applied to communication systems such as DQPSK (differential quadrature phase shift keying), DP-QPSK (dual polarization quadrature phase shift keying), and QAM (quadrature amplitude modulation).

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical output module comprising:
   a laser;
   first phase modulating means for modulating a phase of an optical signal output from the laser based on a first bias voltage in which a first modulation signal is inherent;
   second phase modulating means for modulating a phase of the optical signal output from the laser based on a second bias voltage in which a second modulation signal is inherent;
   phase shift means for shifting a phase of the optical signal output from the laser based on a third bias voltage; and
   bias control means for controlling the third bias voltage,
   wherein an optical signal of which phase is modulated by the first phase modulating means and an optical signal of which a phase is modulated by the second phase modulating means and of which a phase is shifted by the phase shift means are combined to be a modulated optical signal, and the modulated optical signal is output,
   wherein the first phase modulating means modulates a phase of the optical signal output from the laser based on the first bias voltage in which the first modulation signal and a first low-frequency signal are inherent,
   the second phase modulating means modulates a phase of the optical signal output from the laser based on the second bias voltage in which a second low-frequency signal which is a low-frequency signal different from the first low-frequency signal and the second modulation signal are inherent,
   the optical output module further includes detection means for detecting a first power which is the power of the modulated optical signal at a timing where both of a voltage of the first low-frequency signal and a voltage of the second low-frequency signal are one of positive and negative and a second power which is the power of the modulated optical signal at a timing where one of the voltages of the first low-frequency signal and the second low-frequency signal is positive and the other voltage is negative, and
   the bias control means controls the third bias voltage so that a difference between the first power and the second power becomes small based on the detection result of the detection means.

2. The optical output module according to claim 1,
   wherein when the phase of the optical signal is modulated by the first phase modulating means, an optical electric field of the optical signal of which the phase is modulated is periodically changed at a first voltage period according to a voltage used in the phase modulation of the optical signal by the first phase modulating means,
   when the phase of the optical signal is modulated by the second phase modulating means, an optical electric field of the optical signal of which the phase is modulated is periodically changed at a second voltage period according to a voltage used in the phase modulation of the optical signal by the second phase modulating means, and
   an amplitude of the first modulation signal is less than half the first voltage period and an amplitude of the second modulation signal is less than half the second voltage period.

3. The optical output module according to claim 1, further comprising:
first amplifying means for generating an amplified signal of a driving signal as the first modulation signal;
second amplifying means for generating an amplified signal of a driving signal as the second modulation signal;
amplification factor changing means which, after continuing to change an amplification factor of one of the first amplifying means and the second amplifying means for a certain time, continues to change an amplification factor of the other for a certain time;
power detection means for detecting third power of the modulated optical signal when the amplification factor changing means continues to change the amplification factor of the first amplifying means;
the power detection means for detecting fourth power of the modulated optical signal when the amplification factor changing means continues to change the amplification factor of the second amplifying means;
amplification factor setting means for setting the amplification factor of the first amplifying means based on characteristic amounts relating to a change of the third power after the amplification factor changing means continues to change the amplification factor of the first amplifying means for a certain time; and
the amplification factor setting means for setting the amplification factor of the second amplifying means based on characteristic amounts relating to a change of the fourth power after the amplification factor changing means continues to change the amplification factor of the second amplifying means for a certain time.

4. The optical output module according to claim 3,
wherein before both of the amplification factor of the first amplifying means and the amplification factor of the second amplifying means are set, the first phase modulating means modulates a phase based on the first bias voltage in which the first modulation signal is inherent instead of modulating a phase based on the first bias voltage in which the first modulation signal and the first low-frequency signal are inherent, and
before both of the amplification factor of the first amplifying means and the amplification factor of the second amplifying means are set, the second phase modulating means modulates a phase based on the second bias voltage in which the second modulation signal is inherent instead of modulating a phase based on the second bias voltage to which the second low-frequency signal and the second modulation signal are inherent.

5. An optical transceiver comprising an optical output module outputting an optical signal and an optical receiver module receiving an optical signal,
wherein the optical output module includes:
a laser;
first phase modulating means for modulating a phase of an optical signal output from the laser based on a first bias voltage in which a first modulation signal and a first low-frequency signal are inherent;
second phase modulating means for modulating a phase of an optical signal output from the laser based on a second bias voltage in which a second low-frequency signal which is a low-frequency signal different from the first low-frequency signal and a second modulation signal are inherent;
phase shift means for shifting a phase of the optical signal output from the laser based on a third bias voltage;
detection means for detecting a first power which is a power of a modulated optical signal in a period where both of a voltage of the first low-frequency signal and a voltage of the second low-frequency signal are one of positive and negative and for detecting a second power which is a power of the modulated optical signal in a period at a timing where one of the voltages of the first low-frequency signal and the second low-frequency signal is positive and the other voltage is negative, the modulated optical signal formed by combining an optical signal of which a phase is modulated by the first phase modulating means and an optical signal of which a phase is modulated by the second phase modulating means and of which a phase is shifted by the phase shift means; and
bias control means for controlling the third bias voltage so that a difference between the first power and the second power becomes small based on the detection result of the detection means, and
the optical output module outputs the modulated optical signal.

6. The optical transceiver according to claim 5,
wherein the bias control means controls the third bias voltage based on whichever of the first power and the second power is larger so that the phase difference between the optical signal of which a phase is shifted by the phase shift means and the optical signal of which a phase is modulated by the first modulating means is a predetermined state which is one of $90\times(4k+1)°$ and $90\times(4k+3)°$ where k is an integer.

7. An optical communication system comprising:
the optical transceiver according to claim 6;
an optical fiber transmitting the modulated optical signal output from the optical transceiver; and
an optical receiver receiving the modulated optical signal transmitted by the optical fiber,
wherein the optical receiver performs demodulation processing according to a predetermined state which is one of $90\times(4k+1)°$ and $90\times(4k+3)°$.

8. The optical communication system according to claim 7,
wherein the optical receiver includes
a first phase demodulator;
a second phase demodulator demodulating a signal of a phase different from the first phase demodulator; and
a data processing unit outputting output data based on first data output by the first phase demodulator and second data output by the second phase demodulator, and
wherein the data processing unit processing in a predetermined mode which is one of a first mode outputting output data with use of swapping the first data and the second data and a second mode outputting output data with no use of swapping the first data and the second data, wherein the predetermined mode is corresponding to the predetermined state.

9. The optical output module according to claim 1,
wherein the first phase modulating means modulates the phase of the optical signal output from the laser based on the first bias voltage to which the first modulation signal is given but not the first low-frequency signal; and
wherein the second phase modulating means modulates the phase of the optical signal output from the laser based on the second bias voltage to which the second modulation signal is given but not the second low-frequency signal.

10. The optical output module according to claim 1,
wherein the phase shift means shifts the phase of the optical signal output from the laser based on the third bias voltage, without input of the first low-frequency signal for the first bias voltage and without input of the second low-frequency signal for the second bias voltage.

* * * * *